United States Patent Office 2,719,856
Patented Oct. 4, 1955

2,719,856
STEROID KETAL

Robert H. Levin, Kalamazoo Township, Kalamazoo County, Barney J. Magerlein, Kalamazoo, and John L. Thompson, Kalamazoo Township, Kalamazoo County, Mich., assignors to The Upjohn Company, Kalamazoo, Mich., a corporation of Michigan No Drawing. Application October 27, 1952,
Serial No. 317,154

2 Claims. (Cl. 260—397.1)

The present invention relates to the synthesis of a certain steroid compound, and is more particularly concerned with the novel compound, cortisone-3-thioglycollic acid ketal (17α, 21-dihydroxy-5-pregnene - 3,11,20-trione, 3-thioglycollic acid ketal) and the production thereof.

The novel compound of the present invention may be represented by the following structural formula:

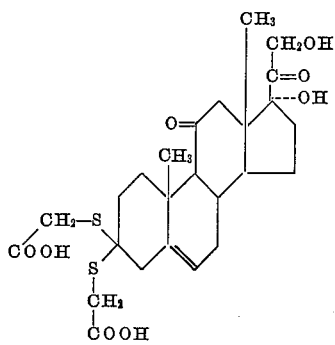

The process of the present invention comprises condensing thioglycollic acid with cortisone in the presence of a catalyst, such as anhydrous zince chloride, or hydrogen chloride together with a dehydrating agent, such as anhydrous sodium sulfate.

It is an object of the present invention to provide novel 17α,21 - dihydroxy - 5 - pregnene - 3,11,20-trione, 3-thioglycollic acid ketal. Another object of the present invention is to provide a process for the preparation of 17α,21-dihydroxy-5-pregnene-3,11,20-trione, 3-thioglycollic acid ketal. Other objects of the invention will be apparent to one skilled in the art to which this invention pertains.

The new compound is physiologically active possessing, for example, protein anabolic properties. It is also a stable, solid intermediate for the preparation of other physiological and pharmaceutically active substances such as the 3-desoxy-steroids, which are obtained from cortisone, 3-thioglycollic acid ketal by treatment with Raney nickel in a suitable solvent. Moreover, the new compound is useful as an intermediate in the preparation of Reichstein's Substance E, 11β,17α,20,21-tetrahydroxy-4-pregnene-3-one. This compound is obtained by reducing cortisone, 3-thioglycollic acid ketal with lithium aluminum hydride to give 11β,17α,20,21-tetrahydroxy-5-pregnene-3-one, 3-thioglycollic acid ketal which may be hydrolyzed with an acid or mercuric chloride to give Reichstein's Substance E.

In carrying out the process of the present invention, cortisone (17α,21-dihydroxy-4-pregnene - 3,11,20-trione) is condensed with thioglycollic acid in the presence of suitable condensing agent. A mixture of fused, finely powdered zinc chloride together with anhydrous sodium sulfate is preferred, but other agents such as dry hydrogen chloride with or without zinc chloride may be used. The condensation takes place at a temperature between zero and 100 degrees centigrade preferably between room temperature and 100 degrees centigrade. It is best started at a temperature between fifty to 100 degrees, but, being exothermic, cooling must be applied to the reaction mixture after the start, which is usually carried out by immersing the reaction flask into an ice-bath. The relative amount of condensing agent used, compared to the amount of cortisone, is not critical, equal to twice the amount of condensing agent to cortisone being preferred. The amount of thioglycollic acid used is usually in excess of two moles of thioglycollic to one mole of cortisone, with twenty to fifty moles of thioglycollic acid or even more to one mole of cortisone being preferred. The reaction mixture is finally poured into ice water and the precipitate recovered by filtration. The product, cortisone, 3-thioglycollic acid ketal, is purified by recrystallization from a solvent such as acetone, methanol, ethanol, ethyl acetate and others.

The following example is illustrative of the process and the product of the present invention, but is not to be construed as limiting.

*Example.—Cortisone, 3-thioglycollic acid ketal*

A mixture of 0.50 gram of cortisone, 0.50 gram of freshly fused and powdered zinc chloride, one gram of anhydrous sodium sulfate and five milliliters of thioglycollic acid was warmed for five minutes on the steam bath and then refrigerated for twenty hours. The mixture was then poured onto sixty grams of crushed ice and the precipitate thus-obtained was separated from the solution by filtration. The crude yield was 0.48 gram of cortisone, 3-thioglycollic acid ketal. Recrystallized from acetone-water and then from methanol gave crystals of pure cortisone, 3-thioglycollic acid of melting point 119 to 122 degrees centigrade.

*Analysis.*—Calculated for $C_{25}H_{34}S_2O_8$: C, 57.01; H, 6.51; S, 12.18. Found: C, 57.17; H, 6.59; S, 12.78.

Infrared analysis confirmed the postulated structure for cortisone, 3-thioglycollic acid ketal.

It is to be understood that the invention is not to be limited to the exact details of operation or exact compound shown and described as obvious modifications and equivalents will be apparent to one skilled in the art, and the invention is therefore to be limited only by the scope of the appended claims.

We claim:

1. A process for the production of 17α,21-dihydroxy-5-pregnene-3,11,20-trione, 3-thioglycollic acid ketal which comprises: mixing together 17α,21-dihydroxy-4-pregnene-3,11,20-trione and thioglycollic acid in the presence of a condensing agent selected from the class consisting of dry hydrogen chloride, a mixture of dry hydrogen chloride and zinc chloride, and a mixture of anhydrous sodium sulfate and fused zinc chloride, at a temperature between zero and one hundred degrees.

2. 17α,21-dihydroxy-5-pregnene-3,11,20-trione, 3-thioglycollic acid ketal of the formula:

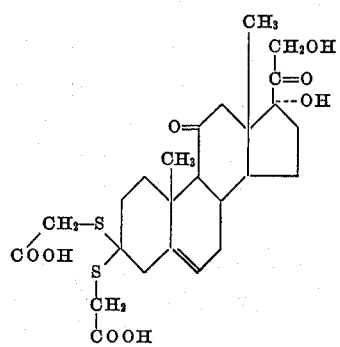

References Cited in the file of this patent

UNITED STATES PATENTS 2,440,660    Bernstein _____ Apr. 27, 1948
2,550,702    Levin _____ May 1, 1951